US008671010B2

(12) United States Patent
Haebig et al.

(10) Patent No.: US 8,671,010 B2
(45) Date of Patent: Mar. 11, 2014

(54) AUTOMATIC PRODUCTION PATH FINDER

(75) Inventors: Peter Haebig, Mannheim (DE); Dieter Hauck, Eberbach (DE); Torsten Ihrig, Mosbach-Neckarelz (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 2480 days.

(21) Appl. No.: 10/880,795

(22) Filed: Jun. 30, 2004

(65) Prior Publication Data

US 2005/0010433 A1  Jan. 13, 2005

(51) Int. Cl.
*G06Q 10/00* (2012.01)

(52) U.S. Cl.
USPC ......... 705/7.27; 705/1.1; 705/7.13; 705/7.21; 705/7.26

(58) Field of Classification Search
USPC .................. 705/1.1, 7.13, 721, 7.26, 7.27
See application file for complete search history.

(56) References Cited

U.S. PATENT DOCUMENTS

| 4,847,761 A * | 7/1989 | Ferriter et al. ................. 705/29 |
| 4,862,376 A * | 8/1989 | Ferriter et al. ................. 700/107 |
| 4,875,162 A * | 10/1989 | Ferriter et al. ................. 705/29 |
| 5,109,337 A * | 4/1992 | Ferriter et al. ................. 705/29 |
| 5,799,286 A * | 8/1998 | Morgan et al. ................. 705/30 |
| 5,877,966 A * | 3/1999 | Morris et al. ................. 716/4 |
| 6,330,542 B1 * | 12/2001 | Sevcik et al. ................. 705/8 |
| 6,819,965 B2 * | 11/2004 | Beatty et al. ................. 700/97 |
| 6,862,585 B2 * | 3/2005 | Planalp et al. ................. 707/1 |
| 2001/0032092 A1 * | 10/2001 | Calver ................. 705/1 |
| 2001/0047274 A1 * | 11/2001 | Borton ................. 705/1 |
| 2002/0049816 A1 * | 4/2002 | Costin et al. ................. 709/206 |
| 2003/0055845 A1 * | 3/2003 | Davidson et al. ................. 707/203 |
| 2003/0120472 A1 * | 6/2003 | Lind ................. 703/13 |
| 2003/0139936 A1 * | 7/2003 | Saucier et al. ................. 705/1 |

FOREIGN PATENT DOCUMENTS

| DE | 19507134 | 7/1996 |
| DE | 19807343 | 9/1998 |
| DE | 19740974 | 3/1999 |
| DE | 19927968 | 12/1999 |
| DE | 10113934 | 9/2002 |
| DE | 10252112 | 6/2003 |
| GB | 2323950 | 10/1998 |
| JP | 06-187354 | 7/1994 |
| JP | 2001-216014 | 8/2001 |
| JP | 2002-244714 | 8/2002 |

OTHER PUBLICATIONS

Google Patent Search of U.S. Appl. No. 10/880,795. Sep. 23, 2013.*

(Continued)

*Primary Examiner* — Dean T Nguyen
(74) *Attorney, Agent, or Firm* — Davidson, Davidson & Kappel, LLC

(57) ABSTRACT

A method for ascertaining creation processes for products in the graphics industry, the product being described by one or more product properties. Starting out from the properties of a product, a network of creation processes (P1, P2, P4) is created, which describes the creation of the product as a function of the resources (1, 1', 2, 2', 3, 3', 4, 5, 6) involved in the creation process, in that the creation processes (P1, P2, P4) upstream of a resource (1, 1', 2, 2', 3, 3', 4, 5, 6) are ascertained.

11 Claims, 1 Drawing Sheet

(56) References Cited

OTHER PUBLICATIONS

Zilberstein, S. "Anytime Sensing, Planning and Action: A Practical Model for Robot Control", In Proceedings of the 13th International Joint Conference on Artificial Intelligence, Chambery, France, 1993, pp. 1-6.*

Andujar, C. "Way-Finder: guided tours through complex walkthrough models", Eurographics 2004, vol. 23, No. 3, pp. 1-10.*

Rejection Notice for corresponding Japanese Patent Application No. 2004-104565 dispatched by the Japanese Patent Office on Dec. 15, 2010 (English translation included).

Rejection Notice for corresponding Japanese Patent Application No. 2004-104565 dispatched by the Japanese Patent Office on May 26, 2010 (English translation included).

Kohji Nonobe and Toshihide Ibaraki, "General-purpose scheduler: an approach by RCPSP," Operations Research: Management Science, Japan, Incorporated associates, Mar. 1, 2000, 45/3, 118-124. (See discussion in the Rejection Notice for corresponding Japanese Patent Application No. 2004-104565).

\* cited by examiner

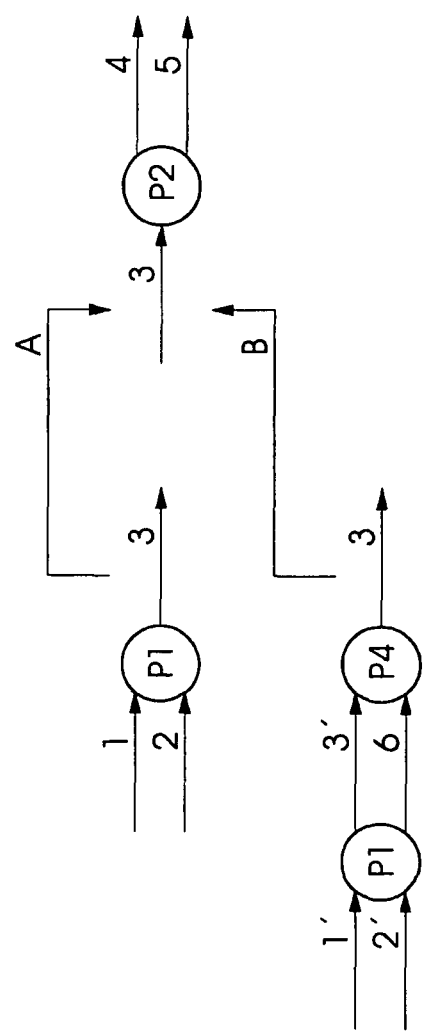

AUTOMATIC PRODUCTION PATH FINDER

This claims the benefit of German Patent Application 103 30 580.7, filed 7 Jul. 2003, which is hereby incorporated by reference herein.

BACKGROUND

The present invention is directed to a method for ascertaining and selecting creation processes for the creation of products in the graphics industry, each product being described by one or more product properties.

To create products in the graphics industry, a precise planning of the creation process is required. This is because, for the most part, a multiplicity of machines is needed to process the printing substrates, as well as a multiplicity of consumables used in the creation of such products. This planning begins with the selection of a printing substrate, which can be obtained in many sizes, grades of material, colors, and so on. The planning continues with the selection of the appropriate printing press as a function of the printed format, the selected printing substrate, and the printing inks, etc., The planning culminates in the subsequent processing using folding machines and packaging machines. Therefore, the production process must be precisely analyzed and planned, to ensure that the necessary machines and consumables are available.

Upon completion of planning a creation process in a printing plant, the process is mostly recorded in so-called job dockets, which, traditionally, as real physical dockets, accompany the printed product on its path through the processing stations. In present-day work-flow systems, these real job dockets are being replaced by virtual job dockets, comprising digital data files, which, from processing station to processing station, are relayed to the participating machines and, thus, accompany the printed product through the creation process. Such a virtual job docket is typically prepared by a printer who has experience and a working knowledge of the machinery of the printing plant. The printer plans, step by step, the creation process from the pre-press stage, through the actual printing process, and culminating in further processing and packaging.

A considerable drawback of this procedure is that only printers, who are intimately familiar with the capabilities of the existing machinery, are able to plan a production process in this way. Moreover, even experienced printers do not recognize all of the available options that their machinery offers. In addition, the computations needed to prepare the creation process are worked out individually and, if necessary, repeated several times by the printer when transition problems among the individual processes arise. An example of such a case is when the printing substrate exits the printing press in a format that a downstream folding machine cannot process. The printer must then add an additional cutting process manually, in order to complete the creation process.

BRIEF SUMMARY OF THE INVENTION

The present invention provides a method to substantially facilitate the planning of creation processes for products in the graphics industry, in particular by a person in charge of jobs in the graphics industry, and to avoid the need for repeatedly computing individual processes. The present invention offers alternative creation processes and, thus, provides flexible solutions. In addition, it is the aim of the present invention to automate the process of computing and optimizing jobs, so that there is no need for the person in charge to have a detailed knowledge of the processes used in the graphics industry.

The present invention provides a method for ascertaining creation processes for products in the graphics industry, the product being described by one or more product properties. Starting out from the properties of a product, a network of creation processes (P1, P2, P4) is created, which describes the creation of the product as a function of the resources (1, 1', 2, 2', 3, 3', 4, 5, 6) involved in the creation process, in that the creation processes (P1, P2, P4) upstream of a resource (1, 1', 2, 2', 3, 3', 4, 5, 6) are ascertained.

BRIEF DESCRIPTION OF THE DRAWINGS

FIG. 1 is a schematic illustration of a process network computed according to an exemplary embodiment of the present invention, and having two alternative paths.

DETAILED DESCRIPTION

Referring now to FIG. 1, there is shown a schematic illustration of a creation process network computed according to an exemplary embodiment of the method of the present invention, and having two alternative paths. The method for ascertaining and selecting creation processes for products in the graphics industry is preferably implemented by a software module arranged to execute on a computer, such as a personal computer (PC) or a laptop. The computer can be placed either in the vicinity of a press that processes printing substrates or set up separately, as for example, an office desk top computer. The PC on which the software runs should be able to communicate with the machines involved in the production process, as is generally known in the art, to enable a job docket created using this software to be directly relayed to the machines involved in production. In principle, any commercially available computer may be used to implement the method of the present invention.

In the exemplary embodiment of the present invention, the method begins at a designation of an end product. The creation processes relevant to the end product are unrolled backwards to identify sub-products and process equipment of an entire creation process network required to create the end product. An end product may comprise a newspaper, a book, or an entire print run, for example. For purposes of discussion, an end product may also comprise a sub-product that will eventually be used to produce a "final" end product. The product to be created is first defined by the operator of the software, e.g., by a person in charge of a creation project.

For example, in the present exemplary embodiment of the present invention, the product "book" may comprise, and thus be defined by the sub-products "book jacket", "book cover", and "body of the book". In this context, the "book cover" may be differentiated, in turn, by "covering", "book cover cardboard", "inside book cover", etc. The "body of the book" can include "bound pages" as well as "individual pages." The sub-product of a book, "individual pages", may be described by properties such as format, color, material, etc. Also, a sub-product ink used for printing on the individual pages may be described, in turn, by properties such as chromaticity, color scheme, color name or ink coverage during the printing process. Based on this example, it becomes clear that virtually every product may be subdivided into further sub-products that are in turn defined by attributes and/or upstream process equipment used to create the sub-product.

Pursuant to the exemplary embodiment of the present invention, there are two options available to the person in charge to define the end product. He may either select a product, or designate product properties and/or attributes. Supported by a software user interface, the person in charge may either select or enter properties and attributes of a desired product, whereby the product is then defined, or select a product from a list of predefined products, whereby the properties of the corresponding product are then established.

To that end, according to a feature of the present invention, all of the properties and attributes of printed products, and the related sub-products, and process equipment are effectively stored in an electronic database. For example, data relating to resources are stored in the PC executing the software module comprising the present invention. Or in the alternative, the database can be stored at a remote storage device that can be accessed by the PC via wire-conducted or wireless communications connections. Resources encompass physical supplies of sub-products used in the creation of the end product, as well as process equipment for creating the product. Therefore, data includes attributes for such process equipment as pre-press equipment, printing presses, folding machines, packaging machines and/or other machines which process printing substrates. In addition, data are provided for physical supplies, such as ink, printing substrate or stock, packaging material, printing plates, and other resources to be considered when setting up a process network for the creation of a product in the graphics industry. The data needed for the process of creation of a product are, of course, dependent on the machines being used.

These data therefore include the available options for the deployed equipment and machines, the sub-products being defined by attributes after passing through a piece of equipment in the process network. However, resources may also be supplied sub-products. Only when both the data pertaining to the equipment, as well as the data pertaining to the supplies are stored in the software, or when the software is able to access these data, is it ensured that realistic process networks can be created and that they are also realizable using existing resources.

According to the present invention, a user, such as a person in charge of a print project, having the software for automatically ascertaining sub-products and creation processes from access to a data base of sub-products and process equipment, can compute and display all possible creation processes on the basis of entered or retrieved data of a printed product. Optional creation processes are computed in consideration of the end printed product and the devices or resources involved in the related creation processes, the resources being understood to include both supplied sub-products, as well as a printing plant's own sub-products, and consumable supplies. According to the prescribed terminology, an end product is also a resource which is at the end of a creation process network. In this context, the person in charge may enter all or some of the properties of the desired printed product at the computer, or call up a finished printed product stored in the database, and, if indicated, modify the same. When the process of defining the printed product is concluded, the computer generates a network of creation processes, whose scope is dependent on the number of resources involved, and required to create the end product. In any case, the present invention ensures that all available options for creating a printed product are able to be presented to the person in charge, such that the user need not be concerned about overlooking an option. This becomes all the more important when the person in charge is not a printer and does not have adequate experience with printing processes. The present invention supports the printer in decisive fashion in generating the proposal for a print job, in the production planning, and in the subsequent production.

As described above, each product and each sub-product is described by their product properties, thus, for example, the sub-product "page" is described by properties such as format, color, material, etc. The product property, ink, in turn, has a plurality of parameters or properties, such as chromaticity, color scheme, color name or ink coverage. This results in different levels of product properties. At a lowest property level, a property is ultimately described by one data type, in physical units. The sub-products and, ultimately, also the end product simultaneously represent the resources in a process network. At the beginning of the process network are resources which, once processed by process equipment, are converted into other resources, until, ultimately, at the end, resources are available as end products. How one resource is converted into another is stipulated by processes which describe the processing of the incoming resources by corresponding process equipment. Such processes include, for example, stitching and folding, or inserting a postcard into a brochure, either by loosely inserting it, by stitching or gluing it in, or in other possible ways.

Referring once again the FIG. 1, there is illustrated two possible, alternative process paths, designated by the reference letters A and B. In any case, however, the two end products, resources 4 and 5, are at the end of the process network. The software module according to the present invention starts at the end products 4 and 5 when setting up the process network, in that the database is searched to ascertain all creation processes, via analysis of process equipment, and sub-products, that lead to the end product. Other upstream processes and sub-products are then sought for the ascertained processes until the beginning of the process network is found where, for example, unprocessed printing substrates are ascertained as the required resource. This means nothing other than that, in this process network, starting out from the indicated input resources 1, 2, 1', 2', and the intermediate creation processes, the end products, for example, resources 4, 5, always emerge. In this context, resources and processes having the same reference numerals in the figure are identical. The two alternative paths A, B in the process network in FIG. 1 materialize, for example, because of so-called different printing uses. The data pertaining to the processes and the resources must be accessible to the computer, to enable it to determine, on the basis of comparisons, the various, alternative upstream processes and resources available to create the desired end product.

More specifically, it is intended, for example, in both paths A and B that the end product 4, which is derived from process P2, to be a pamphlet having four pages, and a format of 44 cm×31.5 cm. In path alternative A, a sheet is printed in the format 63 cm×44 cm, which may be folded into two pamphlet sides. On the other hand, when working with alternative path B, a format of 88 cm×63 cm is printed, which makes an additional trim cut necessary to enable the cut printing substrate to be folded into two pamphlet sides having the desired dimensions. In this context, the printing substrates may be printed on in the same process P1, i.e., in the same printing press, using the format width 63 cm, in the first case, a landscape format being printed, and, in the second case, a longitudinal format. However, when working with path alternative B, it is necessary to include an additional process P4, in which the finished, printed printing substrate is initially cut before it can be fed, in turn, to process P2, i.e., the folding process. In this manner, the person in charge obtains a process network having two alternative possibilities. However, if the printing operation does not have the requisite machine for cutting process P4, then the person in charge will separate alternative B out of the process network. When information on process equipment that is available in the particular printing plant is stored in the database, then this separating-out process may also be carried out automatically, since it is known that the printing plant does not have the necessary cutting machine.

The process network in FIG. 1 may also represent variations in sheet passes. Thus, an eight-color print work may be produced on an eight-color press in one sheet pass, or the process is divided into two four-color sheet passes. In addition, in FIG. 1, the option could also be added of printing in four two-color sheet passes. In this case, there would also be an alternative path C (not shown here).

In the same manner, a four-color face and back printing may be carried out on an eight-color press having a turning device, in one sheet pass, or the process can be divided into two four-color sheet passes on two presses, or one after the other on one and the same press.

One advantageous embodiment of the present invention provides that a process network determined in consideration of certain resources, such as the pamphlet described with respect to the example of FIG. 1, can be stored in a memory device of a computer. This enables each process network to be accessed at any time, when it is necessary to create the same product again, or the process network of the stored product is needed for producing another product. In other words, the stored product is a sub-product for such other product. Thus, there is no need to recompute all parts of a process network when parts of the required new process network are already known and have, therefore, already been computed and stored.

It is also advantageously provided for a computed process network to be compared with the data regarding, for example, process equipment and/or sub-products available at a particular graphics operation. In this manner, those process networks which require process equipment or sub-products that are not available at the particular graphics operation, are separated out. Once, in consideration of the product to be created or the sub-products, the creation processes are made available as a process network, the further procedure is made tremendously easier for the person in charge when he immediately obtains an answer to the question of whether the calculated creation processes can be implemented at all using the available machines in his operation. When the data on existing machines in the printing plant are known from the database, then the software is able to match the process networks to these data, and calculate only those process paths that are feasible for creating the desired end product. In the case that a plurality of paths remains in the process network, then the person in charge may have the software take other information into consideration, such as capacity utilization of the presses, job order deadlines, or other priorities, so that only those paths (or path) which meet these requirements are selected from the process network.

Moreover, in accordance with a feature of the present invention, there can be advantageously provided in the database, for products to be stored as abstract products, for which certain parameters are variable. Such an abstract product can be described as a "template". This means that the product is not uniquely defined, but rather has at least one parameter, i.e., one product property, which may be specified by a user, at least within certain limits. When working with a "book" template, for example, this may connote that the format of the pages inside the book is defined, but the number of pages is left open. In this case, one obtains a template for a body of a book in a specific format, but with a variable number of pages. It is now possible for either all processes in a process network to be displayed which are able to produce a book having this specific format and desired number of pages, or also for those processes in the process network to be considered which represent at least one solution for this template, which, however, cannot be used to create all books which would come under this template. The person in charge may have the computer consider the selection by indicating a particular desire when setting up the process networks.

The present invention can be advantageously arranged in such a way that the computer is able to access information regarding the time needed to complete each particular individual process relating to process equipment stored in the database, in order to calculate the time expenditure for an entire calculated process network. Thus, the person in charge not only obtains a process network, but is also able to plan the timing and scheduling of a desired end product. When a specific deadline is prescribed, the computer can therefore separate out all of those calculated process networks which would not be able to meet the prescribed deadline.

In addition, the present invention is arranged such that the computer is able to determine the outlay or cost required for each such individual process, from cost information stored in the database. Thus, similar to a time determination, the computer can calculate the outlay required for a calculated process network. The process networks are automatically calculated in this manner, so that they are able to be displayed on a computer-generated cost scale, and the person in charge is able to immediately read off the costs to determine a most favorable job order.

In the event of failure or loss of one resource, or if a resource is no longer available, e.g., if a machine breaks down or the supplier of an intermediate product drops out, then a new process network can be calculated according to the present invention, by the computer, without reference to the now unavailable resource or resources. Thus, the newly calculated process network provides the person in charge with an alternative way to continue to arrive at an end product.

In this context, the different paths in the process network may be additionally evaluated, in that, as noted above, the time the individual processes take to run through is stored, and/or the costs which arise when one process converts one input resource into an output resource are stored. This makes it possible for the production to be automatically optimized and, ultimately, also for an offer to be automatically generated for the customer. Whether it is a question of a potentially favorable offer or of a deadline that absolutely needs to be met, the optimal process network is output. In addition, various failure scenarios may also be indicated to the person in charge for instances when a press stops functioning or operating and no replacement of a similar type is available. In such a case, an alternative route is taken, in the figure for example, to path B in the process network, which is not dependent on the broken-down press in path A, this network also being selected by applying the criteria of time and costs, if there are still other alternative networks available. Thus, under certain circumstances, in one step of the process, it may be more beneficial to go back to a preceding resource, to discard the intermediate product created up to that point, and to begin again from that point. Such a procedure is included in the new process network, so there is no need for the person in charge to be overly preoccupied with failure scenarios.

| Reference Symbol List | |
| --- | --- |
| 1, 1' | resources |
| 2, 2' | resources |
| 3 | resources |
| 4 | resources |

-continued

Reference Symbol List

| | |
|---|---|
| 5 | resources |
| 6 | resources |
| P1 | creation process |
| P2 | creation process |
| P4 | creation process |

What is claimed is:

1. A method for creating at least one network of creation processes on a computer for determining production processes for products in the graphics industry comprising the steps of:
describing a printed product on the computer using one or more product properties, the product properties being provided as product data; and
creating at least one network of creation processes on the computer as a function of the product properties of the printed product by unrolling data of the creation processes for creating the printed product backwards, the creating the at least one network of creation processes on the computer comprising:
accessing from a database data of at least one final process for creating the printed product and accessing from the database, as a function of the at least one final process, data of at least one first sub-product processed in the at least one final process and data of at least one first processing machine for processing the at least one first sub-product in the at least one final process.

2. The method as recited in claim 1 further comprising storing the at least one network of the creation processes created on the computer in a memory device of the computer.

3. The method as recited in claim 1 wherein during the step of creating at least one network of creation processes as a function of the product properties of the product with the computer, the at least one first processing machine is compared to available processing machines.

4. The method as recited in claim 1 wherein the describing step includes defining at least one product property as product data and leaving at least one other product property undefined.

5. The method as recited in claim 1 further comprising using the computer to determine a time needed to complete each of the at least one final process, storing each time in a memory device, and calculating a total time for the creation process of the product.

6. The method as recited in claim 1 further comprising using the computer to determine an outlay or cost required for the at least one final process, storing the outlays in a memory device, and calculating the outlay or cost required for the creation process of the product.

7. The method as recited in claim 1 further comprising, in the event of failure or loss of one of the at least one first processing machine, computing at least one alternative network of creation processes.

8. The method as recited in claim 1 wherein the printed product is a final end product and the step of creating the at least one network of creation processes on the computer includes calculating all of the creation processes used to create the final end product.

9. The method as recited in claim 1 wherein a final step of the creating the at least one network of creation processes on the computer includes ascertaining unprocessed printing substrates.

10. The method as recited in claim 1 where the creating the at least one network of creation processes on the computer further comprises accessing from a database data of at least one first sub-product process for creating the at least one first sub-product and accessing from the database, as a function of the at least one first sub-product process, data of at least one second sub-product processed in the at least one first sub-product process and data of at least one second processing machine for processing the at least one second sub-product in the at least one first sub-product process.

11. The method as recited in claim 1 wherein the data of the at least one first sub-product includes data of physical supplies.

* * * * *